US011998073B2

(12) United States Patent
Lin et al.

(10) Patent No.: US 11,998,073 B2
(45) Date of Patent: Jun. 4, 2024

(54) NON-WOVEN PROTECTIVE CLOTHING AGAINST BLOOD AND VIRUSES

(71) Applicant: Web-Pro Corporation, Kaohsiung (TW)

(72) Inventors: Fu-Chun Lin, Kaohsiung (TW); Ping-Sen Liao, Kaohsiung (TW); Ya-Tong Cai, Kaohsiung (TW); Tsung-Chia Wang, Kaohsiung (TW); Chiu-Ti Wang, Kaohsiung (TW)

(73) Assignee: WEB-PRO CORPORATION, Kaohsiung (TW)

( * ) Notice: Subject to any disclaimer, the term of this patent is extended or adjusted under 35 U.S.C. 154(b) by 247 days.

(21) Appl. No.: 17/476,154

(22) Filed: Sep. 15, 2021

(65) Prior Publication Data
US 2023/0041219 A1 Feb. 9, 2023

(30) Foreign Application Priority Data
Aug. 3, 2021 (TW) .................................. 110128614

(51) Int. Cl.
*A41D 31/102* (2019.01)
*B32B 5/02* (2006.01)
(Continued)

(52) U.S. Cl.
CPC ............ *A41D 31/102* (2019.02); *B32B 5/022* (2013.01); *A41D 2500/30* (2013.01); *B32B 27/12* (2013.01);
(Continued)

(58) Field of Classification Search
CPC .. A41D 31/102; A41D 2500/30; B32B 5/022; B32B 27/12; B32B 27/205; B32B 27/32; B32B 2264/104; B32B 2255/10
See application file for complete search history.

(56) References Cited

U.S. PATENT DOCUMENTS

2006/0160453 A1* 7/2006 Suh .......................... B32B 27/12
442/79
2008/0108268 A1* 5/2008 Little ....................... B32B 27/12
428/323
(Continued)

FOREIGN PATENT DOCUMENTS

TW 436279 B 5/2001
TW 201135005 A 10/2011
(Continued)

*Primary Examiner* — Jeremy R Pierce
(74) *Attorney, Agent, or Firm* — Muncy, Geissler, Olds & Lowe, P.C.

(57) ABSTRACT

A non-woven protective clothing against blood and viruses is composed from a non-woven fabric layer, which has two surfaces; and a moisture-permeable layer, which is a porous film that is laminated to one of the surfaces of the non-woven fabric layer; and an elastic pore filling layer, which is a hydrophilic polyurethane. The elastic pore filling layer is coated or printed onto the surface of the moisture-permeable layer, and the thickness of the elastic pore filling layer is thinner than that of the moisture-permeable layer. The synthetic blood permeability of the non-woven protective clothing against blood and viruses can resist a pressure of 2.0 psi for one minute, and the Phi-X174 bacteriophage penetrability thereof can resist a pressure of 2.0 psi for one minute.

10 Claims, 2 Drawing Sheets

(51) Int. Cl.
*B32B 27/12* (2006.01)
*B32B 27/20* (2006.01)
*B32B 27/32* (2006.01)

(52) U.S. Cl.
CPC ............ *B32B 27/205* (2013.01); *B32B 27/32* (2013.01); *B32B 2255/10* (2013.01); *B32B 2264/104* (2013.01)

(56) References Cited

U.S. PATENT DOCUMENTS

2014/0030495 A1* 1/2014 Cartier .................... B32B 27/12
                                                                    156/244.11
2021/0332202 A1* 10/2021 Bell ........................ B32B 27/12

FOREIGN PATENT DOCUMENTS

| TW | 201428033 A | 7/2014 |
| TW | 1705172 B | 9/2020 |

* cited by examiner

NON-WOVEN PROTECTIVE CLOTHING AGAINST BLOOD AND VIRUSES

BACKGROUND OF THE INVENTION

(a) Field of the Invention

The present invention relates to the application and development of a combined waterproof, moisture-permeable non-woven fabric that blocks viruses and blood, and more particularly to a P3 grade (CNS (Chinese National Standards) 14798), bend resistant non-woven protective clothing that protects against blood and viruses, which is provided with the functionality to block viruses and bacteria, as well as prevent blood contamination and guard against infected saliva aerosol particles.

(b) Description of the Prior Art

When an infectious disease epidemic breaks out, there is sudden increase in demand for medical care protective equipment within a short period, with the cost of medical care protective equipment accordingly rising. Moreover, nations worldwide begin to attach importance to problems of shortage in protective equipment, such as protective clothing, masks, etc., among which protective clothing must be provided with resilient film material with specifications including high barrier protection, moisture-penetrability, waterproofing, and lightness. And the European Union Standard EN 14126, United States AAMI (Association for the Advancement of Medical Instrumentation), and Taiwan CNS (China National Standards) have their standard specifications regarding protective clothing for use against viruses and bacterial epidemics. However, the breathability of traditional P3 grade (CNS 14798) medical protective clothing is inferior, and thus there is a need for further development.

Past single layer breathable films are unable to block viruses because of the short breathable paths of the holes in the films, and if the material thickness is increased to lengthen the breathable paths, it is still unable to achieve the requirement for high breathability. Because the prior art is unable to achieve maximized effectiveness, hence, the inferior wearer comfortability, protective clothing made from such materials cannot be worn for long periods of time. When an epidemic breaks out, the demand for protective clothing increases, and because medical personnel need to wear protective clothing for long periods of time, thus, a new generation of protective clothing that must maintain a definite protective effect and improve comfortability has become a subject of future development.

Prior Art using the application of breathable composite laminate materials include Taiwan Patent No. 089110815 that relates to an absorption member provided with a top piece, a rear piece, and an absorption core between the top piece and the rear piece. The rear piece contains a vapor permeable and an essentially liquid impermeable composite laminate material, which is composed of a spun-bonded non-woven fabric adhered to a vapor permeable, thermoplastic film. The non-woven fabric is mainly composed of a first layer fabricated from compatible fibers that can be used to bond a web and a second layer fabricated from some fiber additives and a thermoplastic film that are compatible with a bonding adhesive and some that are incompatible.

Another prior art that has carried out research on moisture-permeability films includes Taiwan Patent No. 102144782, which discloses a moisture-permeable film able to maintain breathability, moisture-permeability, mechanical strength, and practicability, as well as permeable tolerance. A breathable film of Taiwan Patent No. 102144782 contains a polyethylene resin component (A) having a melt wave crest temperature of 130~150° C. and a polyethylene resin density of 0.940~0.970 g/cm$^3$, an inorganic filler material (B), and styrene-based elastomers (C). In addition, relative to the total 100 mass percent of the aforementioned polyethylene resin component (A) and the inorganic filler material (B), a resin component structure with the addition of 1~20 mass percent of the aforementioned styrene-based elastomers (C) has an effusion area less than 5%.

As for the manufacturing method study of antimicrobial compound fabric in the prior Art, Taiwan Patent No. 105106057 discloses an antimicrobial compound fabric combined or adhered to a fabric material. The processed fabric material, which can serve as sterilization material or disinfection material, and also possesses wash durability and non-permeable characteristics. A staining solution used in the processing cycle is composed of one or a plurality of antimicrobial agents, and the processed fabric material undergoes a heat treatment step.

Furthermore, the prior art connected with blood and virus blocking composite fabric coating research includes Taiwan Patent No. 099118884, which discloses a composite fabric composed of a non-woven fabric, wherein a fully-calendered non-woven fabric of fusible fibers is preferred; and a single breathable polymer layer. At least one surface of the fabric has excellent breathability, good abrasion resistance, and provides protection against both blood and virus agents. The composite woven fabric is composed of a single coating layer on a fibrous base material fabric. The composite woven fabric is provided with a MVTR (Moisture Vapour Transmission Rate) of at least 1500 g/m$^2$/day, and has also passed both the ASTM (American Society for Testing Materials) F1670 blood blockage test and the ASTM F1671 virus blockage test.

SUMMARY OF THE INVENTION

High moisture permeability is a necessary requirement for non-woven protective clothing against blood and viruses in addition to being provided with the function to prevent blood and virus penetration. In other words, the surface of a waterproof moisture-permeable combination non-woven cloth for blocking blood and viruses must be completely impervious but must also allow for air dissipation. Accordingly, the present invention provides a non-woven protective clothing against blood and viruses that comprises: a non-woven fabric layer, which has two surfaces and a basis weight ≤70 g/m$^2$; a moisture-permeable layer, which is a porous film with a basis weight between 5~30 g/m$^2$. The percentage by weight of a powder in the moisture-permeable layer is 40~70%, and the draw ratio thereof is ≤400%. Moreover, the average grain diameters in the powder in the moisture-permeable layer are 0.5~3 μm, and calcium carbonate (CaCO$_3$) is used as the powder. The moisture-permeable layer is laminated to one of the surfaces of the non-woven fabric layer. The present invention further comprises an elastic pore filling layer, which is a hydrophilic polyurethane that is composed at least a hydrophilic waterborne polyurethane and a hydrophilic solventborne polyurethane. The elastic pore filling layer is coated or printed onto the surface of the moisture-permeable layer, and the thickness of the elastic pore filling layer is thinner than that of the moisture-permeable layer. The present invention is characterized in that the synthetic blood permeability of the non-woven protective clothing against blood and viruses can resist pressure of 2.0 psi for 1 minute, and the Phi-X174 bacteriophage penetrability thereof can resist pressure of 2.0 psi for 1 minute. Further, after dispersing the powder, the moisture-permeable layer is a drawn porous polyethylene or polypropylene film. The material for the non-woven fabric layer is a selected composition of a spunlace non-woven fabric, a needle-punched non-woven fabric, a spun-bonded non-woven fabric, or a melt-blown non-woven fabric. The fiber diameters in the non-woven fabric layer are 0.5~40 μm, and fiber material therein is at least a polyethylene, polypropylene, polyester, polyvinyl alcohol, rayon, cotton, polyurethane, or a styrene-ethylene)/butylene-styrene copolymer.

The moisture-permeable layer is a three layer extruded film with a layer thickness ratio of 1:1:1, 1:2:1, 1:3:1, 1:4:1, or 1:5:1, and the thickness ratio of the moisture-permeable layer to the elastic pore filling layer is 16:1.5 to 16:3. The moisture-permeable layer laminated to the non-woven fabric layer has a moisture permeability between 1500~7500 g/m²/24 hr, and has a basis weight of 40~100 g/m². The non-woven fabric layer has a moisture permeability that reaches ≥1500 g/m²/24 hr, and the percentage by weight of the powder in the moisture-permeable layer is 40~60%. The moisture-permeable layer has a moisture permeability that reaches ≥1500 g/m²/24 hr, and the average grain diameters in the powder therein are 2 μm; moreover, the moisture-permeable layer has a moisture permeability that reaches ≥1500 g/m²/24 hr. The non-woven protective clothing against blood and viruses has a moisture permeability that reaches ≥1500 g/m²/24 hr. The moisture-permeable layer of the present invention comprises the non-woven fabric layer, the surface of which is provided with at least a three layer extruded film of the moisture-permeable layer, as well as the elastic pore filling layer coated or printed onto the surface of the moisture-permeable layer, thereby achieving the function to block blood and viruses by providing high water pressure resistance and high air permeability.

The structural characteristics of the present invention thus distinguishes and differentiates it from the prior art; moreover, it's originality, advancement, and practical effectiveness are unmistakable. Regarding the technical problems the present invention intends to adopt and objectives thereof, it is believed an in-depth understanding of the aforementioned objects, structure, and characteristics of present invention will be gained after reading the detailed description of the preferred embodiment modes of the present invention in conjunction with the diagrams.

To enable a further understanding of said objectives, structures, characteristics, and effects, as well as the technology and methods used in the present invention and effects achieved, a brief description of the drawings is provided below followed by a detailed description of the preferred embodiments.

DETAILED DESCRIPTION OF THE PREFERRED EMBODIMENTS

The following description uses specific concrete examples to describe the embodiment modes of the present invention. Persons skilled in the related art can easily deduce other advantages and effects of the present invention from the content disclosed in the specification. The present invention can also use other different concrete embodiments to clarify its performance and applications. Each detail described in the specification can also be based on a different perspective and application, enabling various types of modifications and alterations to be carried out without deviating from the spirit of the present invention.

Figure 1:
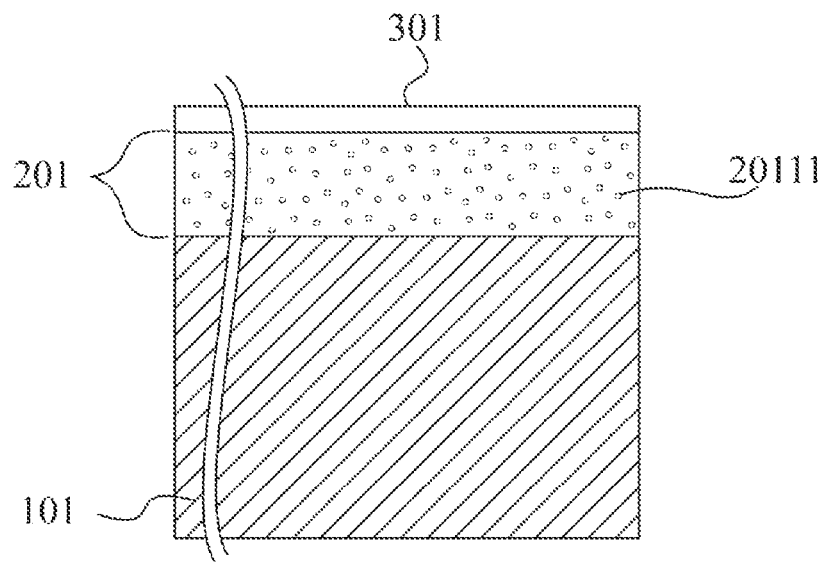
FIG. 1 shows a structural view of a first embodiment mode of the present invention.

Referring first to FIG. 1, the present invention provides a non-woven fabric protective clothing against blood and viruses that comprises: a non-woven fabric layer 101, which has two surfaces and a basis weight of ≤70 g/m²; and a moisture-permeable layer 201, which is a porous film with a basis weight between 5~30 g/m². The percentage by weight of a powder 20111 in the moisture-permeable layer 201 is 40~70%, and the draw ratio thereof is ≤400%. The average grain diameters in the powder 20111 in the moisture-permeable layer 201 are 0.5~3 μm, and calcium carbonate ($CaCO_3$) is used as the powder 20111; moreover, the moisture-permeable layer 201 is laminated to one of the surfaces of the non-woven fabric layer 101. In addition, the present embodiment further comprises an elastic pore filling layer 301, which is a hydrophilic polyurethane that uses at least a hydrophilic waterborne polyurethane and a hydrophilic solventborne polyurethane. The elastic pore filling layer 301 is coated or printed onto the surface of the moisture-permeable layer 201, and the thickness of the elastic pore filling layer 301 is thinner than that of the moisture-permeable layer 201. The present embodiment is characterized in that the synthetic blood permeability of the non-woven fabric protective clothing against blood and viruses can resist a pressure of 2.0 psi for one minute (CNS (China National Standards) 14799), and the Phi-X174 bacteriophage penetrability of the non-woven fabric protective clothing against blood and viruses can resist a pressure of 2.0 psi for one minute (CNS 14800). After dispersing the powder 20111, the moisture-permeable layer 201 is a drawn porous polyethylene or polypropylene film. The material for the non-woven fabric layer 101 is a selected composition of a spunlace non-woven fabric, a needle-punched non-woven fabric, a spun-bonded non-woven fabric, or a melt-blown non-woven fabric. The fiber diameters in the non-woven fabric layer 101 is 0.5~40 μm, and fiber material therein is at least a polyethylene, polypropylene, polyester, polyvinyl alcohol, rayon, cotton, polyurethane, or a styrene-ethylene)/butylene-styrene copolymer. The thickness ratio of the moisture-permeable layer 201 to the elastic pore filling layer 301 is 16:1.5 to 16:3. Because the elastic pore filling layer 301 is a polyurethane material that forms a non-porous moisture-permeable layer after being printed or coated, it has the function to block viruses. Furthermore, the moisture permeability of the elastic pore filling layer 301 is relatively low compared to the porous structure of the moisture-permeable layer 201. Accordingly, the present embodiment controls the film thickness of the moisture-permeable layer 201 so as to be greater than the film thickness of the elastic pore filling to layer 301, thereby increasing the entire moisture permeability of the non-woven protective clothing against blood and viruses. In addition, cost of the moisture-permeable material (polyethylene or polypropylene) of the moisture-permeable layer 201 is a lot lower compared to the material of the elastic pore filling layer 301 (polyurethane), thus achieving the prerequisites of providing the beneficial effects of high moisture permeability, resistance against blood and viruses penetration, and saving on costs by matching and proportioning the thicknesses of the moisture-permeable layer 201 and the elastic pore filling layer 301. The moisture-permeable layer 201 laminated to the non-woven fabric layer 101 has a moisture permeability between 1500~7500 g/m²/24 hr (CNS 12222). The non-woven fabric layer 101 has a basis weight 40~100 g/m²; and has a moisture permeability that reaches ≥1500 g/m²/24 hr (CNS 12222). The percentage by weight of the powder 20111 in the moisture-permeable layer 201 is 40~60%, and has a moisture permeability that reaches ≥1500 g/m²/24 hr (CNS 12222). The average grain diameters in the powder 20111 in the moisture-permeable layer 201 are 2 μm, and has a moisture permeability that reaches ≥1500 g/m²·24 hr (CNS 12222). The non-woven protective clothing against blood and viruses has a moisture permeability that reaches ≥1500 g/m²/24 hr (CNS 12222). Test results for synthetic blood penetrability of the non-woven protective clothing against blood and viruses of the present embodiment using pressure >13.8 kPa showed no penetration (CNS 14799), and test results for virus penetrability using pressure >13.8 kPa showed no penetration (CNS 14800). In other words, the present embodiment has passed CNS 14798 National Standard P3 grade tests.

Figure 2:
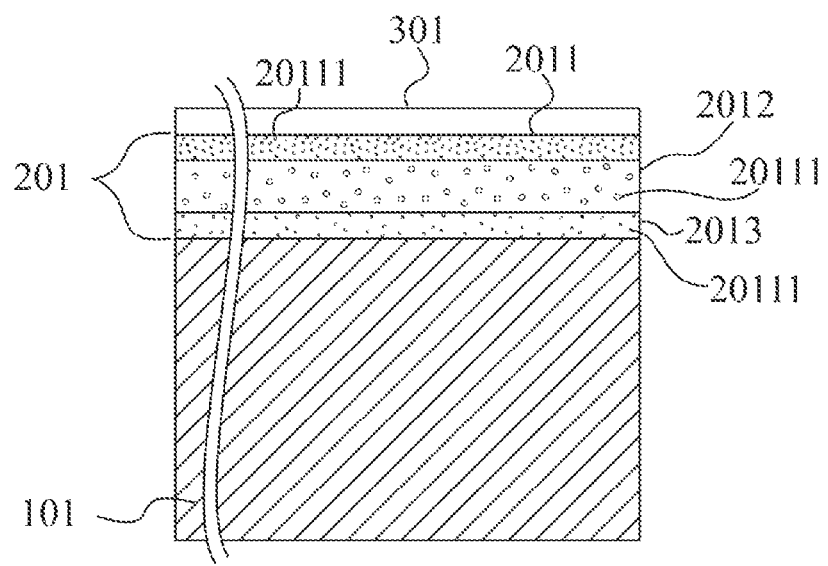
FIG. 2 shows a structural view of a second embodiment mode of the present invention.

Referring to FIG. 2, which shows a second embodiment of the present invention, which is a non-woven protective clothing against blood and viruses that comprises: the non-woven fabric layer 101, which has two surfaces and a basis weight of 38 g/m²; and the moisture-permeable layer 201, which is a three layer extruded film with a basis weight of 12 g/m², wherein the percentage by weight of the powder 20111 in the moisture-permeable layer 201 is 55%, and the draw ratio thereof is 400%. The average grain diameters in the powder 20111 in the moisture-permeable layer 201 are 2 μm, and calcium carbonate $CaCO_3$) is used as the powder 20111; moreover, the moisture-permeable layer 201 is laminated to one of the surfaces of the non-woven fabric layer 101, and has a moisture permeability that reaches 5000 g/m²/24 hr (CNS 12222). In addition, the present embodiment further comprises the elastic pore filling layer 301, which is a hydrophilic polyurethane that is selected from a hydrophilic waterborne polyurethane or a hydrophilic solventborne polyurethane. The elastic pore filling layer 301 is coated or printed onto the surface of the moisture-permeable layer 201, and the thickness of the elastic pore filling layer 301 is thinner than that of the moisture-permeable layer 201. The present embodiment mode is characterized in that the synthetic blood permeability of the non-woven fabric protective clothing against blood and viruses can resist a pressure of 2.0 psi for one minute (CNS 14799); and the Phi-X174 bacteriophage penetrability thereof can resist a pressure of 2.0 psi for one minute (CNS 14800). The material for the non-woven fabric layer 101 is a selected composition of a spunlace non-woven fabric, a needle-punched non-woven fabric, a spun-bonded non-woven fabric, or a melt-blown non-woven fabric, wherein the fiber diameters in the non-woven fabric layer 101 is 10 μm, and the fiber material therein is selected from a polyethylene, polypropylene, polyester, polyvinyl alcohol, rayon, cotton, polyurethane, or a styrene-ethylene/butylene-styrene copolymer. In the present embodiment mode, the moisture-permeable layer 201 is a three layer extruded film comprising a first layer co-extruded film 2011, a second layer co-extruded film 2012, and a third layer co-extruded film 2013, with a layer thickness ratio of 1:1:1, 1:2:1, 1:3:1, 1:4:1, or 1:5:1. Accordingly, the present embodiment mode separates the moisture-permeable layer 201 into 3 layers, which are drawn after respectively dispersing the powder 20111 therein, creating air-permeable paths between the extended first layer co-extruded film 2011, the second layer co-extruded film 2012, and the third layer co-extruded film 2013, and achieving the effect to prevent virus penetration. The thickness ratio of the moisture-permeable layer 201 to the elastic pore filling layer 301 is 16:1.5 to 16:3. The average moisture permeability of the non-woven protective clothing against blood and viruses is 3600 g/m²/24 hr (CNS 12222). In the present embodiment mode, test results for the synthetic blood penetrability of the non-woven protective clothing against blood and viruses using pressure >13.8 kPa showed no penetration (CNS 14799), and test results for virus penetrability using pressure >13.8 kPa showed no penetration (CNS 14800). In other words, the present invention has passed CNS 14798 National Standard P3 grade tests.

In another embodiment mode of the present invention, the non-woven protective clothing against blood and viruses comprises: the non-woven fabric layer 101, which has two surfaces and a basis weight of 70 g/m²; and the moisture-permeable layer 201, which is a three layer extruded film with a basis weight of 5 g/m², wherein the percentage by weight of the powder 20111 in the moisture-permeable layer 201 is 40%, and the draw ratio thereof is 300%. The average grain diameters in the powder 20111 in the moisture-permeable layer 201 are 1 μm, and calcium carbonate ($CaCO_3$) is used as the powder 20111; moreover, the moisture-permeable layer 201 is laminated to one of the surfaces of the non-woven fabric layer 101, and has a moisture permeability that reaches 7500 g/m²/24 hr (CNS 12222). In addition, the present embodiment further comprises the elastic pore filling layer 301, which is a hydrophilic polyurethane that is selected from at least a hydrophilic waterborne polyurethane or a hydrophilic solventborne polyurethane. The elastic pore filling layer 301 is coated or printed onto the surface of the moisture-permeable layer 201. The present embodiment mode is characterized in that the synthetic blood permeability of the non-woven fabric protective clothing against blood and viruses can resist a pressure of 2.0 psi for one minute (CNS 14799); and the Phi-X174 bacteriophage penetrability thereof can resist a pressure of 2.0 psi for one minute (CNS 14800). The material for the non-woven fabric layer 101 is a selected composition of a spunlace non-woven fabric, a needle-punched non-woven fabric, a spun-bonded non-woven fabric, or a melt-blown non-woven fabric, wherein the fiber diameters in the non-woven fabric layer 101 is 0.5 μm, and the fiber material therein is selected from polyethylene, polypropylene, polyester, polyvinyl alcohol, rayon, cotton, polyurethane, polyester/rayon mixed fibers, polyethylene/rayon mixed fibers, or a styrene-ethylene/butylene-styrene copolymer. In the present embodiment mode, the moisture-permeable layer 201 is a three layer extruded film with a layer thickness ratio of 1:1:1, 1:2:1, 1:3:1, 1:4:1, or 1:5:1. The thickness ratio of the moisture-permeable layer 201 to the elastic pore filling layer 301 is 16:1.5 to 16:3. The average moisture permeability of the non-woven protective clothing against blood and viruses is 3600 g/m²/24 hr (CNS 12222). In the present embodiment mode, test results for the synthetic blood penetrability of the non-woven protective clothing against blood and viruses using pressure >13.8 kPa showed no penetration (CNS 14799), and test results for virus penetrability using pressure >13.8 kPa showed no penetration (CNS 14800). In other words, the present invention has passed CNS 14798 National Standard P3 grade tests.

In another embodiment mode of the present invention, the non-woven protective clothing against blood and viruses comprises: the non-woven fabric layer 101, which has two surfaces and a basis weight of 40 g/m²; and the moisture-permeable layer 201, which is a three layer extruded film with a basis weight of 30 g/m², wherein the percentage by weight of the powder 20111 in the moisture-permeable layer 201 is 70%, and the draw ratio thereof is 400%. The average grain diameters in the powder 20111 in the moisture-permeable layer 201 are 3 μm, and calcium carbonate ($CaCO_3$) is used as the powder 20111; moreover, the moisture-permeable layer 201 is laminated to one of the surfaces of the non-woven fabric layer 101, and has a moisture permeability that reaches 1500 g/m²/24 hr (CNS 12222). In addition, the present embodiment further comprises the elastic pore filling layer 301, which is a hydrophilic polyurethane that is selected from at least a hydrophilic waterborne polyurethane or a hydrophilic solventborne polyurethane. The elastic pore filling layer 301 is coated or printed onto the surface of the moisture-permeable layer 201. The present embodiment mode is characterized in that the synthetic blood permeability of the non-woven fabric protective clothing against blood and viruses can resist a pressure of 2.0 psi for one minute (CNS 14799); and the Phi-X174 bacteriophage penetrability thereof can resist a pressure of 2.0 psi for one minute (CNS 14800). The material for the non-woven fabric layer 101 is a selected composition of a spunlace non-woven fabric, a needle-punched non-woven fabric, a spun-bonded non-woven fabric, or a melt-blown non-woven fabric, wherein the fiber diameters in the non-woven fabric layer 101 is 40 μm, and the fiber material therein is selected from polyethylene, polypropylene, polyester, polyvinyl alcohol, rayon, cotton, polyurethane, or a styrene-ethylene/butylene-styrene copolymer. In the present embodiment mode, the moisture-permeable layer 201 is a three layer extruded film with a layer thickness ratio of 1:1:1, 1:2:1, 1:3:1, 1:4:1, or 1:5:1. The thickness ratio of the moisture-permeable layer 201 to the elastic pore filling layer 301 is 16:1.5 to 16:3. The average moisture permeability of the non-woven protective clothing against blood and viruses is 3600 g/m²/24 hr (CNS 12222). In the present embodiment mode, test results for the synthetic blood penetrability of the non-woven protective clothing against blood and viruses using pressure >13.8 kPa showed no penetration (CNS 14799), and test results for virus penetrability using pressure >13.8 kPa showed no penetration (CNS 14800). In other words, the present invention has passed CNS 14798 National Standard P3 grade tests.

The present invention provides a non-woven protective clothing against blood and viruses with distinguishing features that include providing a three layer extruded film of the moisture-permeable layer 201 on the surface of the non-woven fabric layer 101, and coating or printing the elastic pore filling layer 301 onto the surface of the moisture-permeable layer 201, which are able to improve the bend resistance characteristics of the non-woven protective clothing against blood and viruses. The present invention was bent through 180 degrees at least 5000 times, and the bent areas showed no visual signs of cracking. The present invention is distinct and differentiates itself from the prior art; its originality, advancement, and practical effectiveness are unmistakable, and enable effective improvements on the shortcomings of prior art, and, therefore, has considerable practicability in use.

In conclusion, the concrete structures of the embodiments disclosed above enable the non-woven protective clothing against blood and viruses of the present invention to perform the functions of bend resistance, high water pressure resistance, and high air permeability. The overall structure of the present invention has not been seen in like products, moreover, the contents of this specification have not been publicly disclosed prior to this application, clearly complying with the essential elements as required for a new patent, Accordingly, a patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A non-woven protective clothing against blood and viruses, comprising:
   a non-woven fabric layer, which has two surfaces, with a basis weight ≤70 g/m²; a moisture-permeable layer, which is a porous film, with a basis weight between 5~30 g/m²; the percentage by weight of a powder in the moisture-permeable layer is 40~70%, and the draw ratio thereof is ≤400%; moreover, the average grain diameters in the powder in the moisture-permeable layer are 0.5~3 μm, and calcium carbonate ($CaCO_3$) is used as the powder, and the moisture-permeable layer is laminated to one of the surfaces of the non-woven fabric layer;
   an elastic pore filling layer, which is a hydrophilic polyurethane that is composed of at least a hydrophilic waterborne polyurethane and a hydrophilic solventborne polyurethane, wherein, the elastic pore filling layer is coated or printed onto the surface of the moisture-permeable layer, and the thickness of the elastic pore filling layer is thinner than that of the moisture-permeable layer; wherein a moisture permeability of the elastic pore filling layer is lower than a moisture permeability of the moisture-permeable layer;
   wherein, the synthetic blood permeability of the non-woven protective clothing against blood and viruses being capable of resisting pressure of 2.0 psi for 1 minute, and the Phi-X174 bacteriophage penetrability thereof being capable of resisting pressure of 2.0 psi for 1 minute.

2. The non-woven protective clothing against blood and viruses according to claim 1, wherein after dispersing the powder, the moisture-permeable layer is a drawn porous polyethylene or polypropylene film.

3. The non-woven protective clothing against blood and viruses according to claim 1, wherein the material for the non-woven fabric layer is a selected composition of a spunlace non-woven fabric, a needle-punched non-woven fabric, a spun-bonded non-woven fabric, or a melt-blown non-woven fabric.

4. The non-woven protective clothing against blood and viruses according to claim 1, wherein the fiber diameters in the non-woven fabric layer are 0.5~40 μm.

5. The non-woven protective clothing against blood and viruses according to claim 1, wherein the fiber material in the non-woven fabric layer is at least a polyethylene, polypropylene, polyester, polyvinyl alcohol, rayon, cotton, polyurethane, or a styrene-ethylene and/or butylene-styrene copolymer.

6. The non-woven protective clothing against blood and viruses according to claim 1, wherein the moisture-permeable layer is a three layer extruded film with a thickness layer ratio of 1:1:1, 1:2:1, 1:3:1, 1:4:1, or 1:5:1.

7. The non-woven protective clothing against blood and viruses according to claim 1, wherein the thickness ratio of the moisture-permeable layer to the elastic pore filling layer is 16:1.5 to 16:3.

8. The non-woven protective clothing against blood and viruses according to claim 1, wherein the moisture-permeable layer laminated to the non-woven fabric layer has a moisture permeability between 1500~7500 g/m²/24 hr.

9. The non-woven protective clothing against blood and viruses according to claim 1, wherein the non-woven fabric layer has a basis weight of 40~70 g/m² and the moisture permeability of the non-woven fabric layer reaches ≥1500 g/m²/24 hr.

10. The non-woven protective clothing against blood and viruses according to claim 1, wherein the percentage by weight of the powder in the moisture-permeable layer is 40~60%, and the moisture permeability of the moisture-permeable layer reaches ≥1500 g/m²/24 hr.

* * * * *